US006711333B2

(12) United States Patent
West et al.

(10) Patent No.: US 6,711,333 B2
(45) Date of Patent: Mar. 23, 2004

(54) WIDEBAND, MULTI-CORE DISPERSION COMPENSATION FIBER

(75) Inventors: James A. West, Painted Post, NY (US); William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/125,966

(22) Filed: Apr. 19, 2002

(65) Prior Publication Data

US 2003/0198449 A1 Oct. 23, 2003

(51) Int. Cl.[7] .............................. G02B 6/20; G02B 6/02
(52) U.S. Cl. ....................................... 385/126; 385/125
(58) Field of Search .................... 385/125, 126

(56) References Cited

U.S. PATENT DOCUMENTS

| | | | |
|---|---|---|---|
| 5,459,804 A | * | 10/1995 | Stowe ......................... 385/42 |
| RE35,138 E | * | 1/1996 | Weidman ..................... 385/42 |
| 5,673,354 A | * | 9/1997 | Akasaka et al. ............ 385/127 |
| 5,742,722 A | * | 4/1998 | Imoto ......................... 385/126 |
| 5,822,488 A | * | 10/1998 | Terasawa et al. ........... 385/127 |
| 6,154,594 A | * | 11/2000 | Fiacco et al. ............... 385/126 |

* cited by examiner

*Primary Examiner*—John D. Lee
*Assistant Examiner*—Daniel Valencia
(74) *Attorney, Agent, or Firm*—Kevin M. Able; William J. Chervenak (57) ABSTRACT

Disclosed is a multiple core optical waveguide fiber having a negative total dispersion and negative total dispersion slope tailored to compensate the total dispersion of a typical high performance transmission fiber over a selected wavelength range. Also disclosed is a method of making the multiple core optical waveguide fiber and a compensated link using the multiple core fiber. The simplicity of the refractive index profiles of the constituent cores provides ease of manufacture of the multiple core structure.

16 Claims, 8 Drawing Sheets

WIDEBAND, MULTI-CORE DISPERSION COMPENSATION FIBER

BACKGROUND OF THE INVENTION

1. Field of the Invention

The invention is directed to a dispersion compensating optical waveguide fiber, a method of making the dispersion compensating optical waveguide fiber, and an optical communications link containing the dispersion compensating fiber and more particularly to a dispersion compensating optical waveguide fiber having a multiple core.

2. Technical Background

Optical telecommunication systems operating at very high bit rates typically require a low attenuation, large effective area optical waveguide fiber to achieve acceptable span lengths between electronic signal regenerator installations. The operating wavelength window extending from about 1450 nm to 1650 nm is attractive because of the low attenuation exhibited by silica based optical waveguide fibers over that wavelength range. To operate a system in this desired wavelength range, a transmission optical waveguide fiber was developed having a zero dispersion wavelength in or near this wavelength range. At the same time, the transmission optical waveguide fiber was designed to have large effective area in order to limit dispersion due to those non-linear effects that increasingly degrade the signal as signal power density increases.

A further advance in optical waveguide fiber design was made by locating the fiber zero dispersion wavelength outside the wavelength range over which the fiber was to be operated. By maintaining total dispersion magnitude greater than zero, preferably greater than about |0.5 ps/nm-km|, the negative impact of the non-linear phenomenon, four wave mixing, was essentially eliminated.

However, because the total dispersion of the improved fiber was not zero over the operating wavelength window and desired span lengths were long, there was a need to compensate for the total dispersion accumulated over a span length. The concept of a dispersion compensating fiber, having a total dispersion opposite in sign to that of the transmission fiber, was explored and appropriate dispersion compensating fibers were developed and proven successful. The dispersion compensating fibers developed typically incorporated a core refractive index profile having two or more distinct segments, a design that is generally more costly to manufacture in comparison to a step index profile or a graded index profile having only one segment.

An additional requirement was placed upon the dispersion compensating fiber in that high data rate telecommunication systems generally employ wavelength division multiplexing. If the dispersion compensating optical waveguide fiber was to be effective, compensation had to be relatively uniform over the band of wavelengths of the multiplexed signals. That is, the slope of the total dispersion of the compensating fiber had to be adjusted to achieve uniform compensation over an operating band of wavelengths.

Although, the segmented core dispersion compensating fibers have served to improve system performance, the total dispersion of the compensating fibers exhibit considerable curvature over the preferred operating wavelength range. Work has therefore continued to design dispersion compensating optical waveguide fibers that exhibit the desired total dispersion, linearity of total dispersion over the operating window, and afford relatively low manufacturing cost.

SUMMARY OF THE INVENTION

One aspect of the invention is a multiple core, dispersion compensating optical waveguide fiber that includes a center region surrounded by a clad layer. The center region includes at least two optical waveguide fiber cores. An optical waveguide fiber core is defined as the structure that serves to confine light within the fiber. Each of the cores has a refractive index profile. At least two cores have refractive index profiles that are different from each other. The refractive index profiles of the respective cores and their relative positioning within the center region provide for coupling of light from one core to at least one other core. The multiple core optical waveguide fiber is configured to have negative total dispersion and negative total dispersion slope over a pre-selected wavelength range.

In an embodiment of this aspect of the invention, the pre-selected wavelength range extends from about 1525 nm to 1565 nm, and the total dispersion slope is more negative that −4.0 ps/nm$^2$-km over the pre-selected wavelength range. In this embodiment, the ratio of total dispersion to the total dispersion slope can be approximately 50 nm at 1550 nm. Additionally, in this embodiment the total dispersion is substantially linear (total dispersion slope is substantially constant) over the pre-selected wavelength range.

In another embodiment of this aspect of the invention, the center region includes at least seven structural elements arranged as six structural elements surrounding a centrally positioned structural element. The centrally positioned structural element has a refractive index profile which guides light and so it properly denoted a core. At least three of the surrounding structural elements are cores.

In another embodiment of this aspect of the invention, the center region contains at least seven structural elements of substantially equal diameter arranged as six structural elements surrounding a centrally positioned structural element configured to be a core. At least three of the surrounding structural elements are configured to be cores. The centrally positioned core and the three surrounding cores each contain a dopant material that serves to increase the relative refractive index percent of respective portions of the respective cores. When the dopant material causes the refractive index of the core portion to increase, the value of the relative refractive index percent of the doped portion is positive, as can be seen from the definition of relative refractive index percent given below. The remaining three surrounding structural elements have a uniform refractive index. The cores having a uniform refractive index can be fabricated without use of a dopant material, although a dopant material can be used to uniformly raise or lower the refractive index of the core relative to that of the clad layer. In the case where a structural element of the center region of the multiple core optical waveguide fiber has a relative refractive index percent equal to or less than that of the cladding layer, the structural element does not function to confine light to the fiber and so is denoted a spacing element. The six surrounding structural elements can advantageously be arranged so that each surrounding core containing a dopant material over a core portion is neighbored by two surrounding cores of uniform refractive index. The cores containing a dopant material over a core portion preferably have their portions of increased relative refractive index percent positioned to include and be symmetrically distributed about their respective centerlines. Preferably, the centrally positioned core has a portion having a relative refractive index percent (Δ%) of approximately 2.0%, the portion having a diameter of approximately 3 μm. In the context of reference to the Δ% and radius of the core or clad of an optical waveguide fiber, the term approximately generally means ±/−10% of the nominal value stated. This 10% tolerance will be understood to pertain to all relative refractive index percent and radius values stated throughout the specification. Also preferably, the surrounding cores containing a dopant material over a core portion each have a portion of relative refractive index percent of approximately 1.0%, the portion having a diameter of approximately 6.4 µm. The surrounding cores having a uniform relative refractive index percent over the core preferably have a relative refractive index percent of approximately 0.7%. Preferably in this embodiment each of the seven cores has an outside diameter of approximately 12 µm. As is described in more detail below, any of the core portions having a non-zero relative refractive index percent can be characterized by a particular refractive index profile shape, which is represented in two dimensions as the curve of relative refractive index percent versus radius. For example, the centrally positioned core preferably has a refractive index profile which is a step although this profile can be an α-profile, as defined below, with the α parameter equal to approximately 2.

An alternative embodiment of a multiple core optical waveguide fiber including seven structural elements exhibits a configuration similar to the configuration described immediately above. Preferably, the centrally positioned structural element is a core having a portion having a relative refractive index percent of approximately 2.0%, the portion having a diameter of approximately 3.5 µm. In this embodiment, the refractive index profile of the centrally positioned core is an a-profile having an a of approximately 2, although the index profile can also be a step. Also preferably, three of the surrounding structural elements are cores containing a dopant material over a core portion each have a relative refractive index percent of approximately 0.35% over the portion, the portion having a diameter of approximately 10.9 µm. The remaining three surrounding structural elements are spacing elements, that is, they are of uniform relative refractive index percent and are essentially silica and so have a uniform Δ% of zero. Preferably in this embodiment each of the four cores and three spacing elements has an outside diameter of approximately 13 µm.

Another aspect of the present invention is a method of making a multiple core optical waveguide fiber. A plurality of core or spacing element preforms are fabricated, each of the respective preforms having a refractive index profile and at least two of the core preforms having respective refractive index profiles that are different from each other. The preforms are bundled to form a multiple core preform structure. A clad layer is deposited or positioned on the bundled preforms to form a draw preform, which is drawn into a multiple core optical waveguide fiber. The clad layer may take the form of a tube in which the cores are placed. The cores may be bundled before placement in the tube or the tube itself may serve as the bundling structure. The multiple core preform structure is configured so that light propagating in the drawn fiber couples between at least two of the multiple cores of the drawn fiber and total dispersion and total dispersion slope of the drawn fiber are negative over a pre-selected wavelength range. The amount of coupling depends upon the respective refractive index profiles and center to center spacing of the cores between which light couples. The factors that determine the amount of coupling serve to provide the desired properties of the multiple core waveguide fiber.

In an embodiment in accord with the method, at least one of the core preforms includes a dopant material to increase the relative refractive index percent of a portion of the core preform.

In a further embodiment in accord with the method, the plurality of core or spacing elements preforms includes at least seven preforms configured such that a centrally positioned preform is a core preform surrounded by six preforms. Preferably, the seven preforms have substantially equal diameter so that the surrounding preforms abut or nearly abut the centrally located preform as well as two neighboring preforms.

Another aspect of the present invention is an optical waveguide fiber link in which transmission fiber dispersion is compensated by a fiber in accord with the invention. The link includes at least a first and a second length of optical waveguide fiber optically coupled to each other in series arrangement. The first fiber length can be taken to be the transmission fiber having a positive total dispersion and positive total dispersion slope over a pre-selected wavelength range. The second fiber length can be taken to be the compensating fiber having a negative total dispersion and negative total dispersion slope over the pre-selected wavelength range. Each of the first and second fibers is characterized by an end to end dispersion defined as the total dispersion multiplied by the fiber length. In accord with the convention usually used in the art, a fiber is said to have positive total dispersion if shorter wavelength light travels at a higher speed in the fiber than does longer wavelength light. A fiber having negative total dispersion is defined conversely.

The second fiber length, the fiber length having negative total dispersion and negative total dispersion slope, is a multiple core fiber in accord with the invention. Light propagating in the multiple core fiber couples between at least two of the cores. The total dispersion and total dispersion slope of the first and second fibers and their lengths are selected such that the sum of the respective end to end dispersions of the first and second fiber is less than a pre-selected value over the pre-selected wavelength range.

A preferred pre-selected operating wavelength range is from 1490 nm to 1650 nm and more preferably from 1500 nm to 1600 nm. A yet more preferred pre-selected wavelength range is 1525 nm to 1565 nm.

The sum of the respective end to end dispersions over the pre-selected operating wavelength range is preferably less than or equal to 25 ps per nano-meter of source spectral width and more preferably less than or equal to 15 ps/nm. Preferably, the sum of the respective end to end dispersions over a pre-selected operating wavelength range from about 1525 nm to 1565 nm is less than approximately 12 ps/nm. The preferred sums of end to end dispersion can be reached by matching the total dispersion and total dispersion slope of the respective first and second fibers. As an alternative, a third fiber can be introduced into the link to compensate residual dispersion. The third fiber can have essentially any combination of respective signs of total dispersion and total dispersion slope to compensate residual dispersion. For example, a step index single mode optical waveguide fiber, such as Corning SMF-28™ can be used as the third fiber. In the case where the third fiber has a positive total dispersion and positive total dispersion slope, the magnitudes thereof are different from those of the fiber having total dispersion and total dispersion slope of positive sign.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 2:
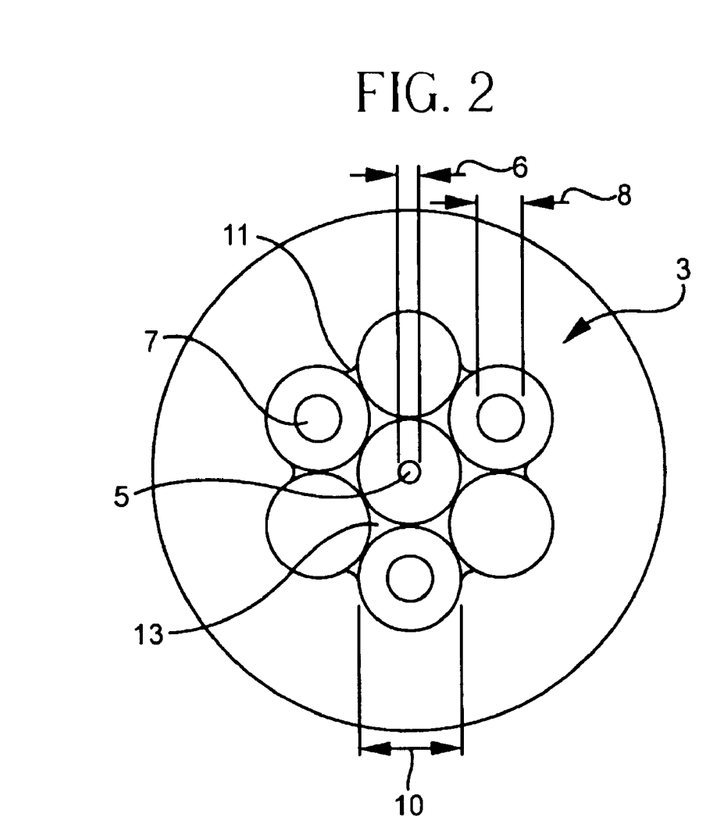
FIG. 2 is a schematic cross section of an embodiment of a multiple core optical waveguide fiber or a multiple core optical waveguide fiber preform in accord with the invention.

Reference will now be made in detail to the present preferred embodiments of the invention, examples of which are illustrated in the accompanying drawings. Whenever possible, the same reference numerals will be used throughout the drawings to refer to the same or like parts. One embodiment of the multiple core optical waveguide fiber or multiple core optical waveguide fiber preform of the present invention is shown in FIG. 2. The illustration in FIG. 2 is representative of the cross section of a multiple core optical waveguide fiber or a multiple core preform from which a multiple core optical waveguide fiber can be drawn. The multiple core optical waveguide fiber dimensions and those of the preform are related by a linear scaling factor.

The embodiment of the invention shown in FIG. 2 includes a center region having seven structural elements of approximately equal diameter 10, six structural elements being arranged around a centrally positioned structural element which is a core. The centrally positioned core incorporates a portion 5 having diameter 6 and characterized by a positive relative refractive index percent. In the embodiment of FIG. 2, portion 5 of the centrally positioned core includes and is symmetrical about the centerline. The relative refractive index percent of portion 5 is preferably 2.0% and the diameter 6, referring now to an optical waveguide fiber, is preferably 3.0 μm. Curved bridging lines 11 are drawn to indicate the bridging between adjacent cores that can occur during the drawing step. The interstices 13 among the structural elements can fill during the step of drawing. The interstices 13 or any of the spaces among the structural elements can also be filled with a material prior to the drawing step to preserve the shape of the center region structural elements.

Figure 3:
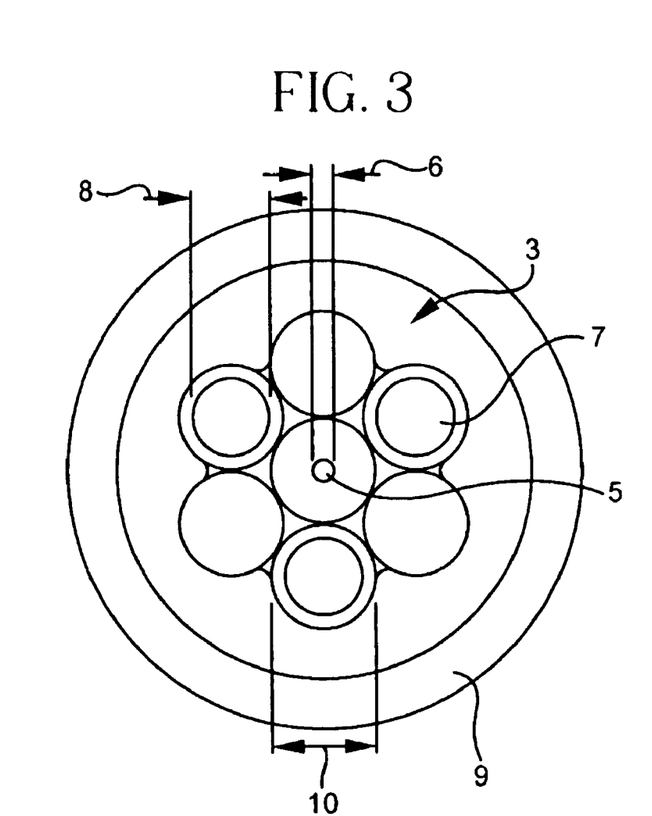
FIG. 3 is a schematic cross section of an embodiment of a multiple core optical waveguide fiber or a multiple core optical waveguide fiber preform in accord with the invention.
Figure 3A:
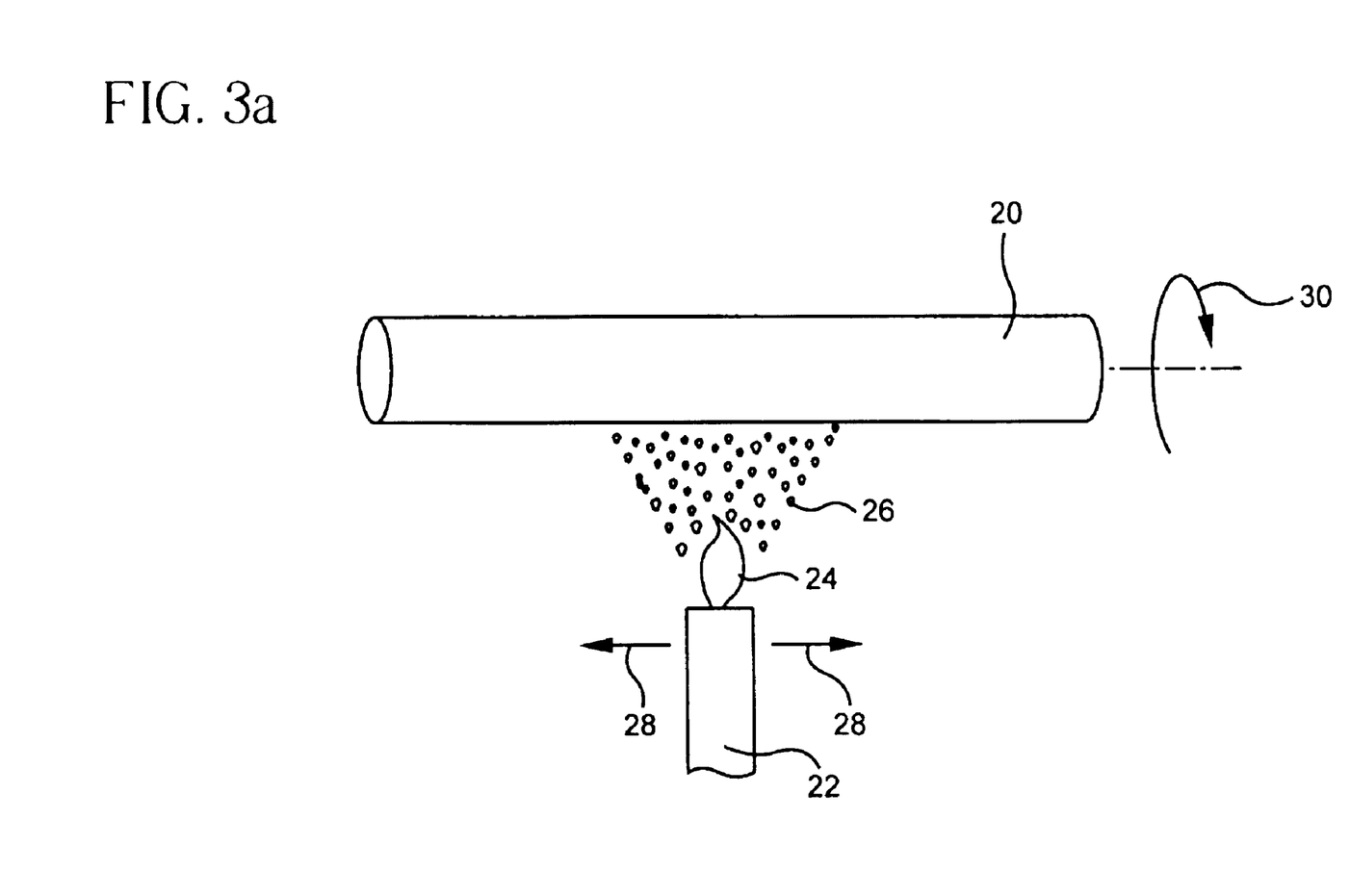
FIG. 3a is a schematic of deposition apparatus suitable for depositing the preforms or the clad layer.

Clad layer 3 surrounds the center region of the fiber. In FIG. 3, clad layer 3 is shown as including a tube 9, illustrative of the alternative methods of applying the clad. The clad layer can be applied by deposition methods as illustrated in FIG. 3a, by positioning a tube about the multiple core, or by combinations of deposition and tube positioning. FIG. 3a schematically illustrates the basic apparatus for deposition of glass soot. Target rod 20, which can be a bait rod of carbon, silica, or alumina, for example, or the multiple core structure in accord with the invention, is rotatably mounted as indicated by arrow 30. A gas or a vapor precursor material is injected into burner 22 and passed through flame 24 where the precursor material reacts to form glass soot particles 26. Soot particles 26 are projected toward and adhere to rotating target rod 20. Burner 22 traverses target rod 20 as indicated by arrows 28 to uniformly deposit soot particles 26. The clad layer can be formed entirely by deposition. As an alternative, the clad layer can be formed by depositing a layer and positioning a tube, made for example of silica, over the deposited layer. Another alternative is that a tube may be positioned over a multiple core structure in accord with the invention prior to the step of depositing.

Throughout the specification, the preferred dimensions will be stated for a multiple core optical waveguide fiber, although it will be understood that the dimensions can also be stated for a preform from which the optical waveguide fiber is drawn, because the dimensions of the optical fiber and the preform from which the optical fiber is drawn are linearly related.

The relative refractive index percent of portion 5 can be made positive either by adding an index increasing dopant material, such as germanium, to portion 5 or by adding an index decreasing dopant material, such as fluorine, to the region of the centrally positioned core surrounding portion 5. Combination of refractive index increasing and decreasing dopants can also be used to provide a core, that is, a structural element that is configured to guide light.

In a preferred embodiment, the seven structural elements have diameters 10 that are substantially equal to each other, the diameter having a value of approximately 12 μm. Because the diameters are substantially equal, the surrounding structural elements each abut or nearly abut the centrally positioned core and two neighboring surrounding structural elements. Three of the six surrounding structural elements have a portion 7 having diameter 8 and a positive relative refractive index percent. Diameter 8 is approximately 6.4 μm and the relative refractive index percent is approximately 1.0%. The remaining three surrounding structural elements have a substantially uniform refractive index of approximately 0.7%. In this embodiment each of the structural elements is a core. The six surrounding cores are arranged such that each core having a portion 7 of positive relative refractive index percent is neighbored by two surrounding cores having a substantially different refractive index profile. In this embodiment the substantially different refractive index profile is a uniform profile. The portions 5 and 7 having positive relative refractive index percent can have a refractive index profile which is a step, a rounded step, or an alpha profile, this last profile shape being described by the equation, $n(r)=n_0\sqrt{1-2\Delta(r/a)^\alpha}$, where, $n_0$ is the maximum refractive index of the core of the optical fiber, $\Delta$ is the relative refractive index, a is radius of the portions 5 or 7, r is radial position (0<r<a) measured from the center of the core, and $\alpha$ (alpha) is a parameter. The preferred shape is a step in this embodiment. The relative index $\Delta$ is defined as, $$\Delta = \left[\frac{n_0^2 - n_c^2}{2n_0^2}\right],$$

where $n_c$ is the refractive index of the clad layer, typically pure silica.

The relative refractive index percent $\Delta\% = \Delta \times 100$.

Figure 4:
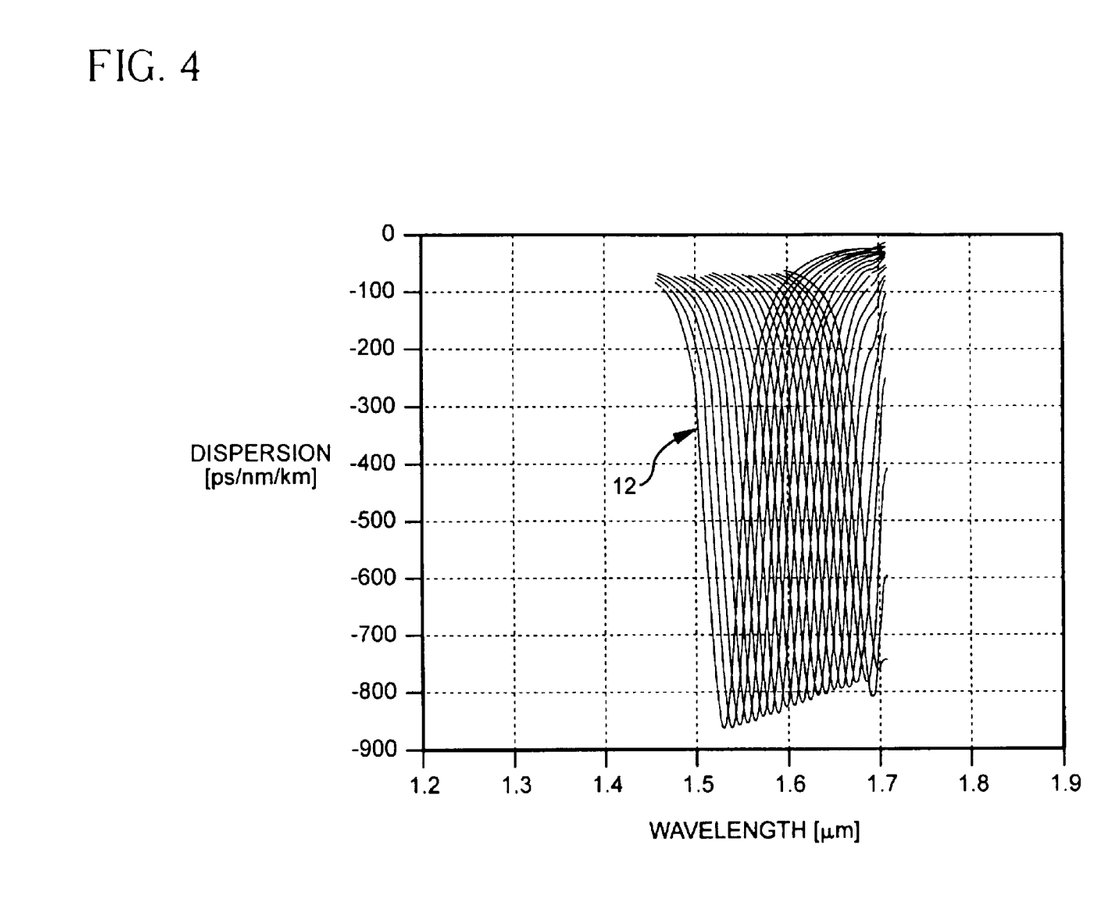
FIG. 4 is a chart of dispersion versus wavelength for a multiple core optical waveguide fiber in accord with FIG. 2.

The family of curves 12 shown in FIG. 4 shows the wavelength dependence of the total dispersion of the multiple core fiber made in accord with the embodiment shown in FIG. 2. Curve 12 farthest to the right in FIG. 4 corresponds to the core dimensions set forth above in the description of FIG. 2. Moving from right to left in the FIG. 4 chart, each successive curve 12 corresponds to a 0.5% linear reduction in the diameter of the cores as compared to the diameters of the cores corresponding the curve immediately preceding. Portions 5 and 7 of the cores having a positive relative refractive index percent portion are similarly reduced in diameter by 0.5%. Thus the first curve to the left of the right-most curve 12 has a centrally positioned core of outside diameter 11.94 μm and a portion 5 of diameter 2.99 μm. The six surrounding cores each have outside diameter 11.94 μm, and the three surrounding cores having a positive relative refractive index percent portion each have portions 7 of diameter 6.37 μm.

Figure 1:
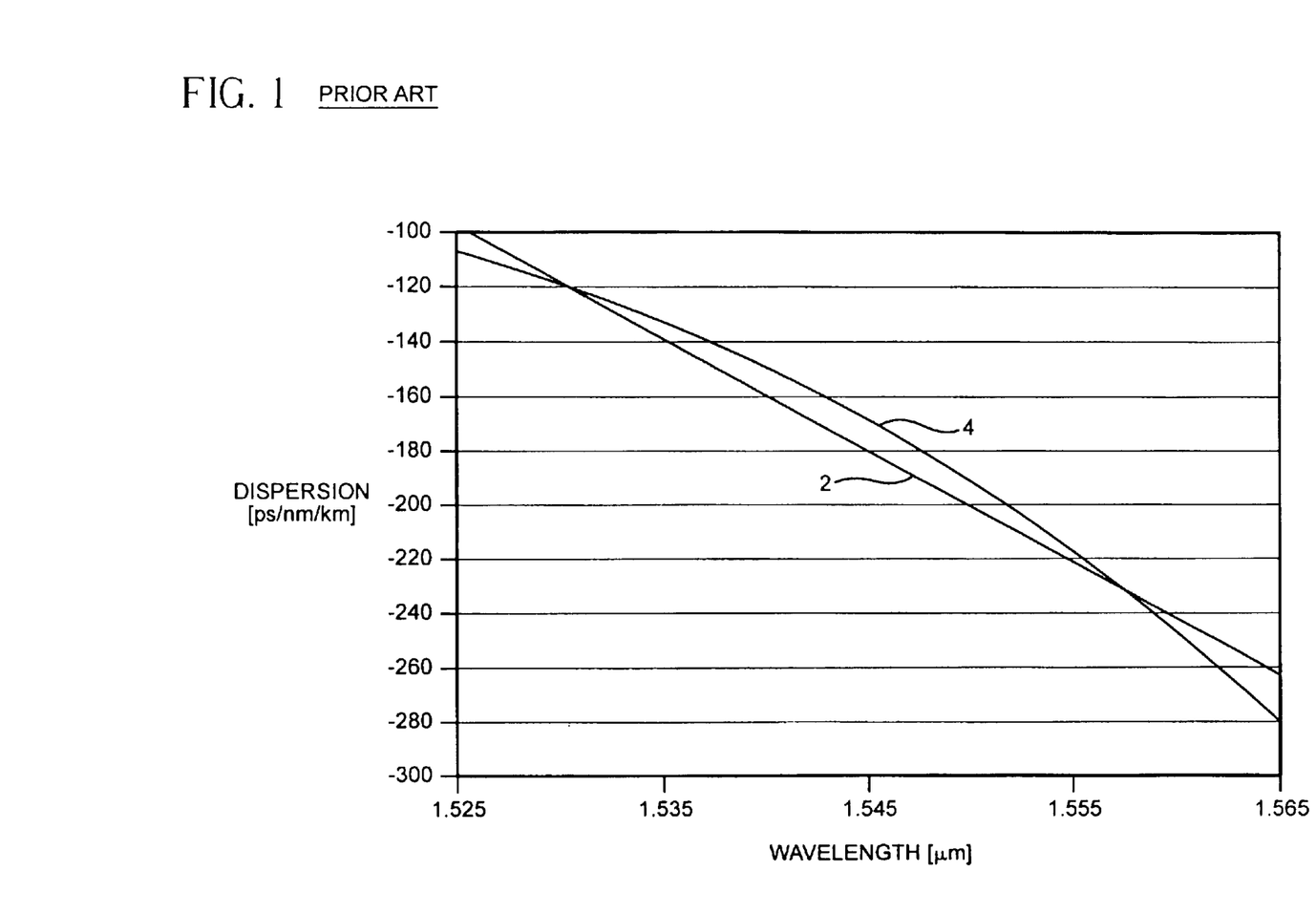
FIG. 1 is an adjusted chart showing an overlay of dispersion versus wavelength of a transmission fiber and a dispersion compensating fiber in accord with the prior art.

Curves 12 exhiit a negative total dispersion and negative total dispersion slope over advantageously placed portions of operating wavelength bands. The left-most curve 12 is substantially constant in total dispersion slope over a wavelength band extending from about 1500 nm to 1530 nm. For comparison, reference is made to a prior art dispersion compensating optical waveguide fiber having a wavelength dependence of total dispersion shown as curve 4 of FIG. 1. Curve 2 is the wavelength dependence of total dispersion of a transmission fiber suitable for use in a high data rate (high bit rate) telecommunication system. The total dispersion scale has been adjusted and the slope of curve 2 changed in sign so that curves 2 and 4 are superposed one upon the other. The curvature apparent in curve 4 is characteristic of dispersion compensating optical waveguide fibers of the prior art. This curvature in curve 4 means that each of the wavelengths of an extended operating wavelength range cannot be equally compensated, so that the dispersion performance of a link that includes this prior art compensating fiber will not be equivalent for the plurality of channels of a multiplexed communication system. The link will be limited by the performance of the channel having the poorest compensation, that is, the greatest end to end dispersion.

It is understood that total dispersion and total dispersion slope can be adjusted by adjusting the respective refractive index profiles of the individual cores and their relative positioning. It is contemplated that the multiple core design in accord with the invention can provide a wide range of combinations of total dispersions and total dispersion slopes.

Returning to FIG. 4, the wavelength band covered by the dispersion compensating fibers in accord with this embodiment of the invention is shifted upward by about 8.8 nm from one curve 12 to the next, moving in a left to right direction in FIG. 4. Thus, the multiple core optical waveguide fiber in accord with the invention enables one to adjust the compensated wavelength band by simply scaling the radial dimensions of the cores. The set of curves shown in FIG. 4 cover a wavelength band from about 1500 nm to 1700 nm. The multiple core optical waveguide fiber in accord with the invention can be configured to compensate a transmission fiber over operating wavelength bands above and below the 1500 nm to 1700 nm range.

Figure 5:
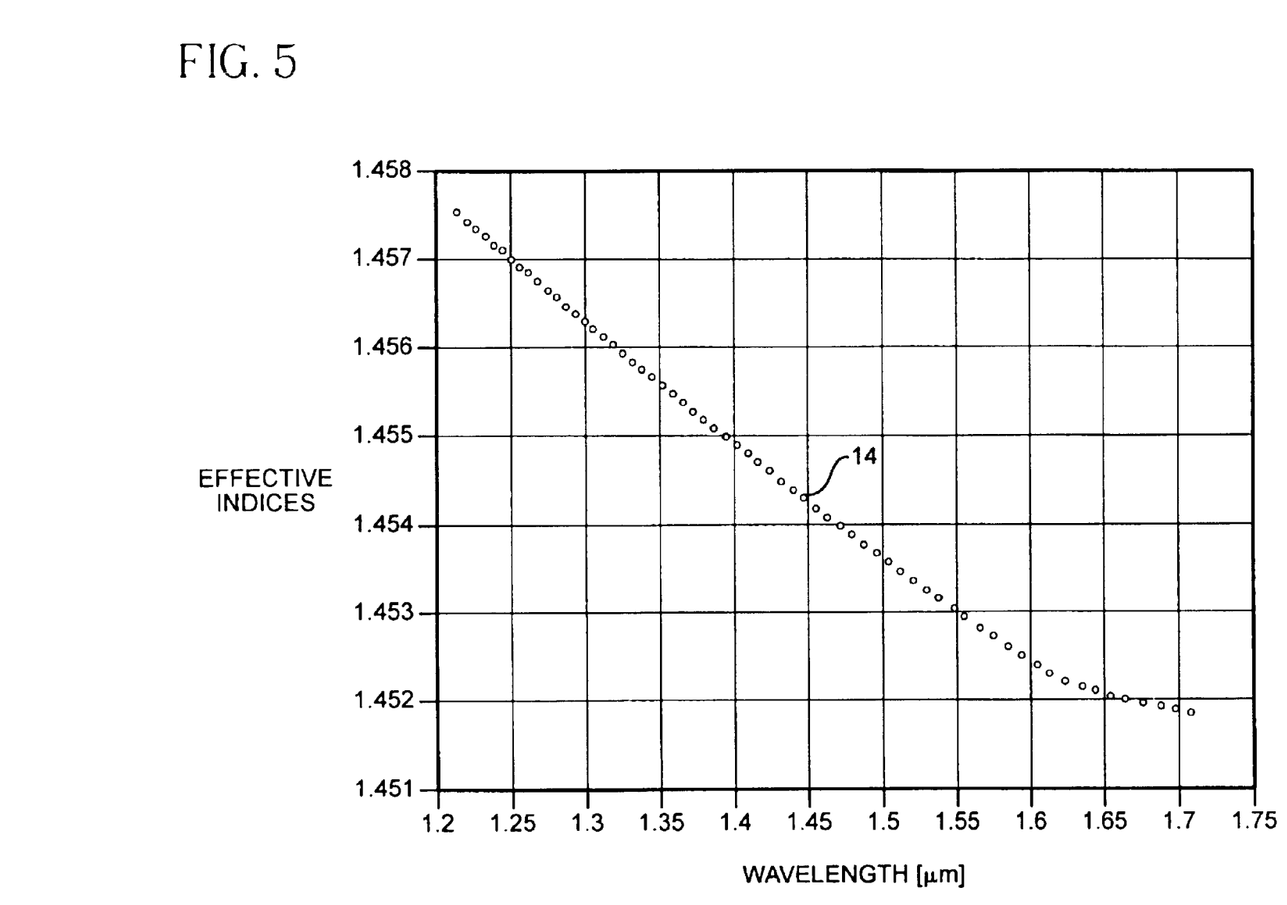
FIG. 5 is a chart of effective index versus wavelength for a multiple core optical waveguide fiber in accord with FIG. 2.

The chart of effective index versus wavelength, curve 14 of FIG. 5, is indicative of the total dispersion of the associated fiber, in this case the fiber having a multiple core in accord with FIG. 2, because total dispersion is found from the change in slope of the effective index versus wavelength curve. In mathematical terms, the total dispersion is directly proportional to the second derivative of the effective index with respect to wavelength. Curve 14 of FIG. 5 shows the corresponding fiber has essentially zero dispersion from about 1200 nm to about 1500 nm. The slope is essentially constant over this wavelength range. The slope begins to change at wavelengths above 1500 nm, the change in slope reaching a maximum value in the wavelength range from about 1600 nm to 1650 nm. The multiple core structure in accord with the invention affords the flexibility to move the curvature from one wavelength range to another as well as to control the amount of curvature. Because light couples between the cores, the power density in the individual cores is lowered. This effect could serve to limit such non-linear contributions to dispersion as self phase modulation, cross phase modulation, and modulational instability, which are proportional to signal power density. The individual cores can be either of uniform index or can have a single portion of raised relative refractive index percent. The individual cores therefore are readily made using any of several methods known in the art such as vapor deposition, described above, modified vapor deposition, and variations of these, including use of sleeving tubes, successive deposition steps, or combinations of sleeving and deposition steps. The bundling of the core preforms to form the multiple core preform is readily accomplished, for example, by inserting the individual core preforms into a tube or fusing the individual core preforms to each other by heating or by a combination of heating and use of a glass frit.

Techniques for making multiple core optical waveguide fiber, including the bundling step, are known in the art, and are set forth for example in U.S. Pat. No. 6,154,594, Fiacco et al., incorporated herein by reference in its entirety. The method described therein is sufficiently flexible to accommodate multiple cores having 2 to 10 or more cores. The number of cores desired in a particular multiple core design depends upon several factors including the strength of coupling among the cores, the targeted size and shape of signal power distribution, and the properties the multiple core fiber is intended to exhibit. It will be understood that the exemplary multiple core fibers, which include at least seven cores, do not impose limits or constraints on the core configurations contemplated in the invention.

Important functional properties, such at attenuation, of optical waveguide fibers having a core identical to those which make up the multiple core fiber in accord with the invention are suited to the desired properties of a fiber for use in a high bit rate telecommunication system. Thus, the multiple core fiber in accord with the invention will have acceptably low attenuation and typical specified tolerances on geometrical properties.

Another embodiment of the invention is shown in FIG. 3. The multiple core fiber includes seven structural elements configured as discussed in the embodiment including seven cores described above relative to FIG. 2. The outside diameter 10 of the seven substantially equal diameter structural elements is approximately 13 μm. The centrally positioned structural element is a core having positive relative refractive index percent portion 5 of preferred Δ% value of approximately 2.0% and preferred radius 6 of approximately 3.5 μm. The refractive index profile of relative refractive index percent portion 5 is preferably an α-profile of α approximately 2. Three surrounding structural elements are cores having a positive relative refractive index percent portion 7 having a preferred Δ% of approximately 0.35% and respective preferred radii of approximately 10.9 μm. The refractive index profile of portion 7 is preferably approximately a step index. The remaining three surrounding structural elements are of uniform refractive index and are essentially silica so that they are spacing elements. The three surrounding cores are neighbored on each side by a spacing element.

Figure 6:
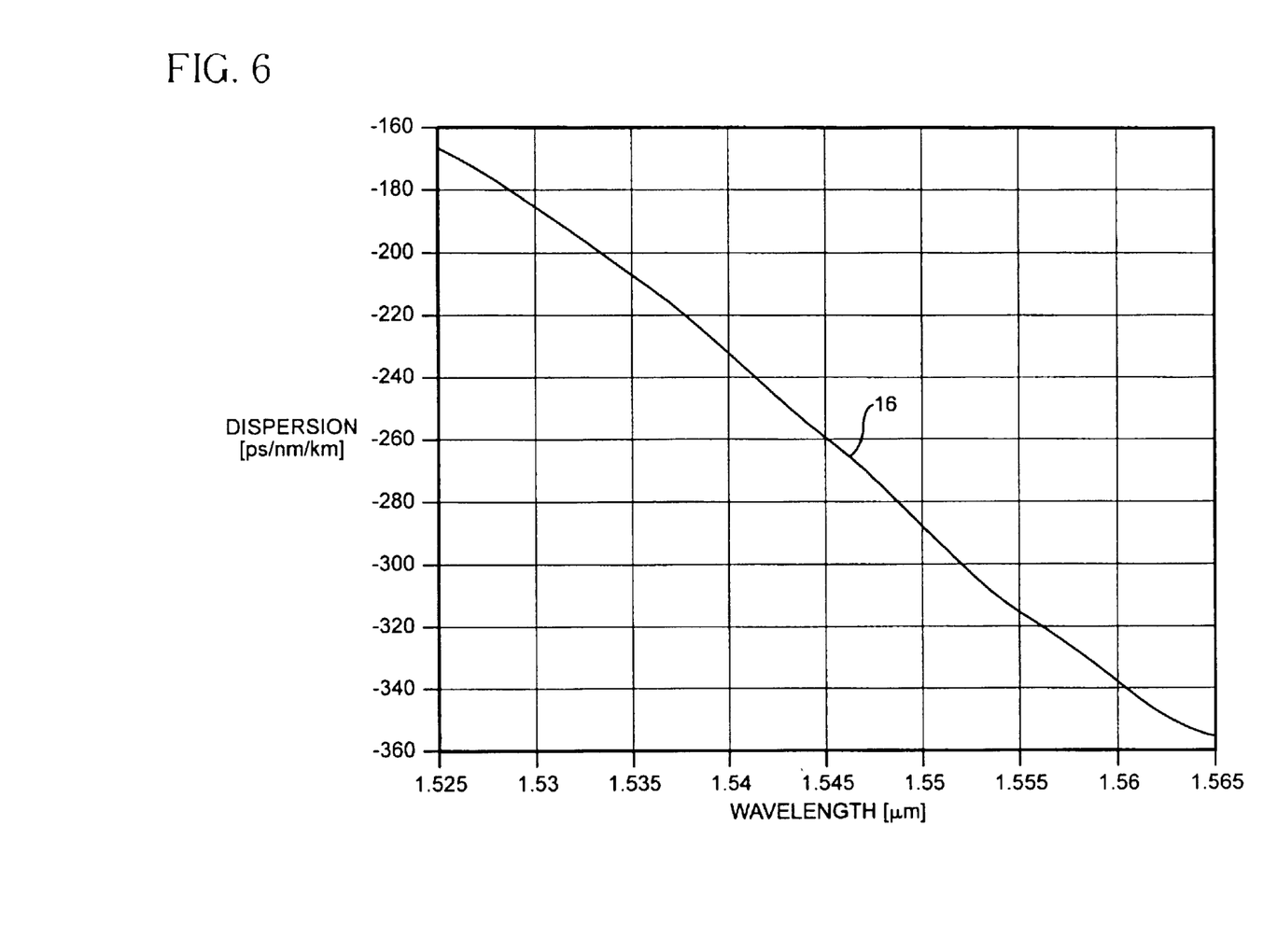
FIG. 6 is a chart of dispersion versus wavelength for a multiple core optical waveguide fiber in accord with FIG. 3.
Figure 7:
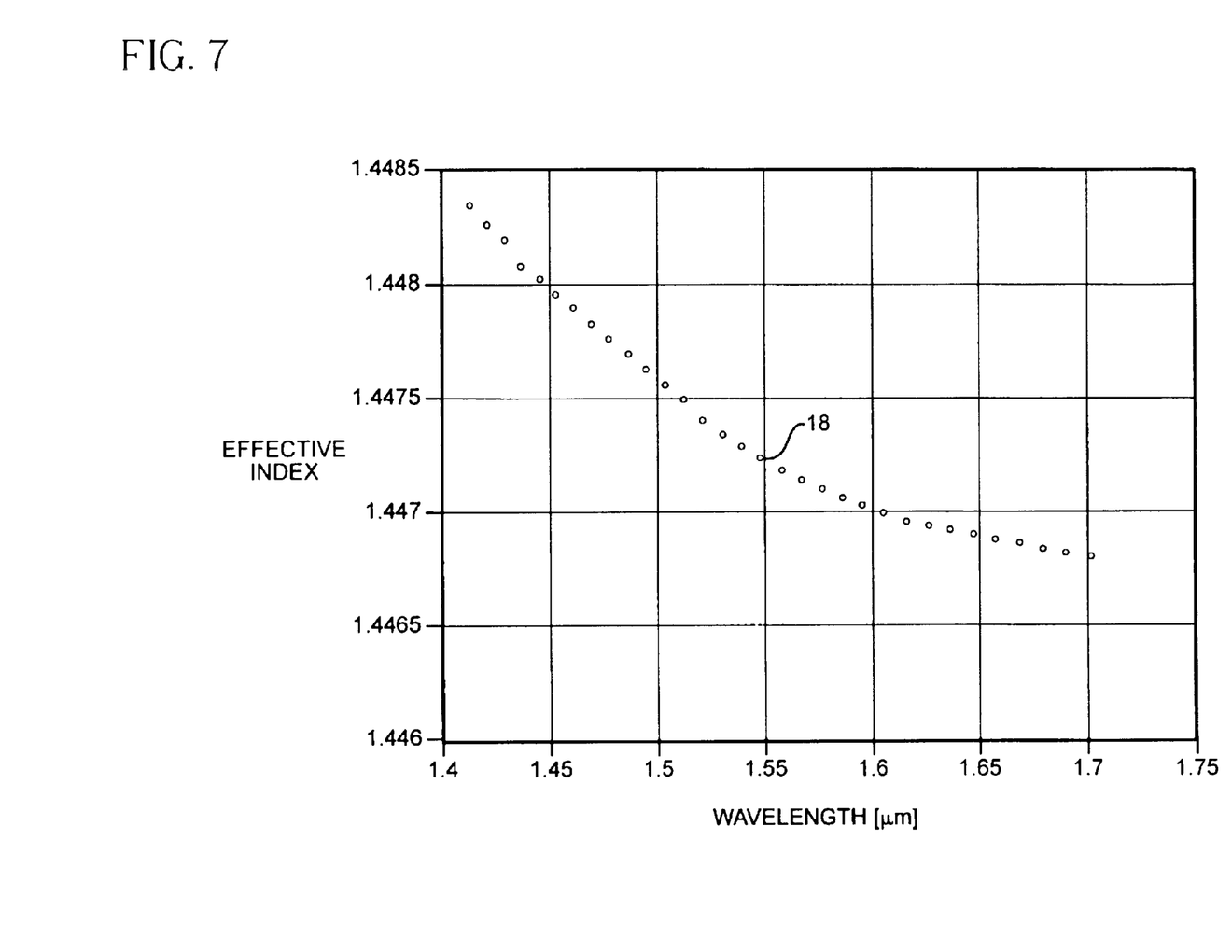
FIG. 7 is a chart of effective index versus wavelength for a multiple core optical waveguide fiber in accord with FIG. 3.

FIG. 6 shows the linearity of the total dispersion versus wavelength, curve 16, over a wavelength range extending from about 1525 nm to 1565 nm. Attenuation of silica based optical waveguide fiber is advantageously low over this wavelength range. In addition, the combination of large negative total dispersion and total dispersion slope allows use of a shorter length of compensation fiber relative to the length of the transmission fiber. A typical dispersion shifted transmission fiber has total dispersion less than approximately 10 ps/nm-km. Curve 18 of FIG. 7, a chart of effective index of the fundamental mode versus wavelength, shows that maximum dispersion occurs in the wavelength range from about 1550 nm to 1600 nm.

Figure 8:
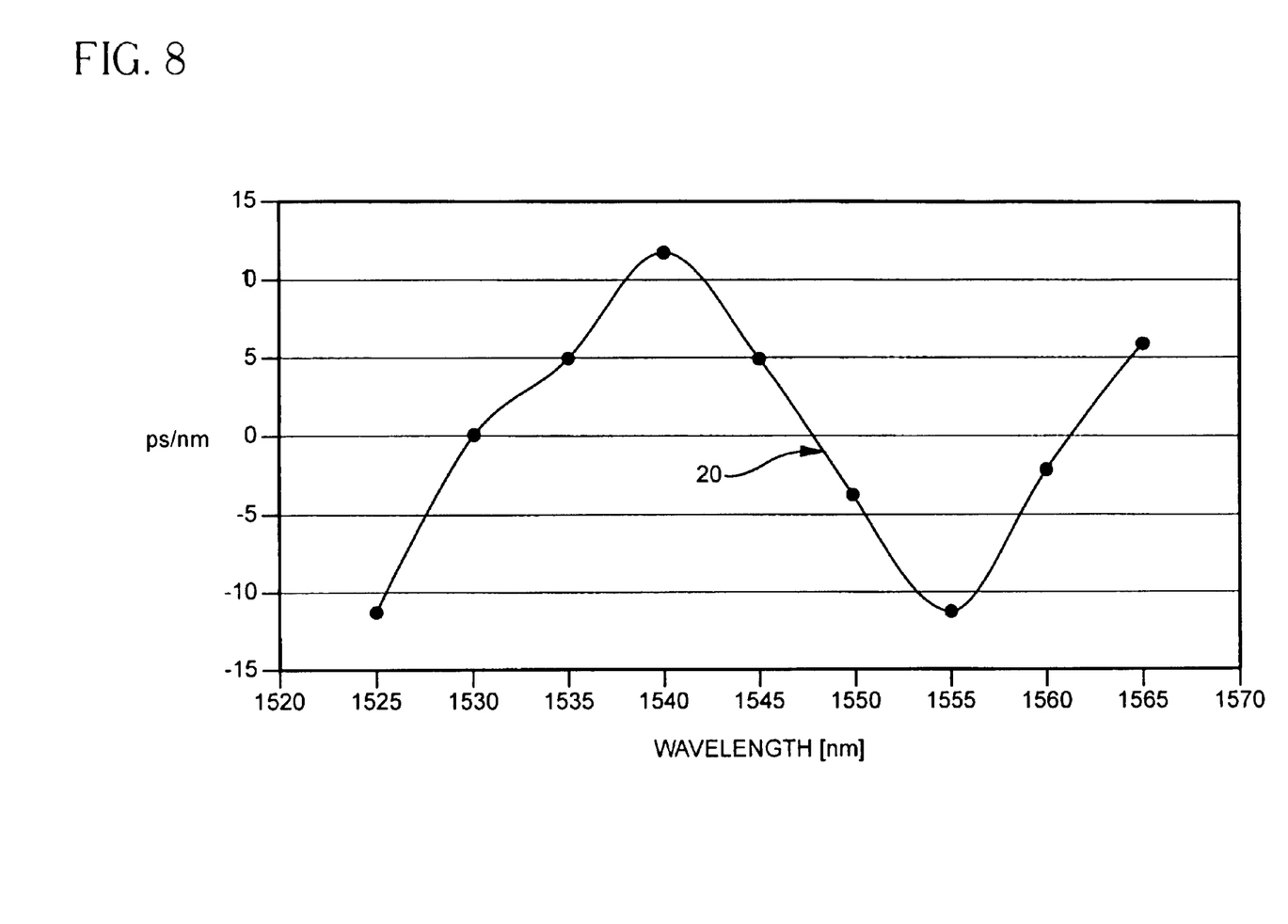
FIG. 8 is a chart of end to end dispersion versus wavelength for a compensated telecommunication fiber link.

FIG. 8 is a chart of residual dispersion of a dispersion compensated link. In this example embodiment of a compensated link in accord with the invention, 100 km of transmission fiber is compensated using about 1.8 km of compensating multiple core fiber made in accord with the invention as embodied in FIG. 3, discussed in detail above. The transmission fiber has a zero dispersion wavelength near 1500 nm and a dispersion slope of about 0.09 ps/nm²-km at 1550 nm. A third fiber, used to compensate residual total dispersion, is used in this example link. The following results are obtained through use of about 5.5 km of step index single mode optical waveguide fiber such as SMF-28™ available from Corning. The residual total dispersion, shown as curve 18 in FIG. 8, nm does not exceed 12 ps/nm over the wavelength range form about 1525 nm to 1570. This compensated link is thus well suited for use in a telecommunication system incorporating high data rate transmission including wavelength division multiplexing.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A multiple core, dispersion compensating optical waveguide fiber comprising:
   a center region surrounded by a clad layer; wherein,
   said center region comprises at least two optical waveguide fiber cores having respective refractive index profiles, the respective refractive index profiles of the at least two optical waveguide fiber cores being different from each other, wherein light couples between the at least two optical waveguide fiber cores;
   the at least two optical waveguide fiber cores of said multiple core optical wave guide fiber being selected to provide a total dispersion slope and a total dispersion that are negative over a pre-selected wavelength range.

2. The multiple core optical waveguide fiber of claim 1 wherein the pre-selected wavelength range extends from about 1525 nm to 1565 nm.

3. The multiple core optical waveguide fiber of claim 2 wherein a total dispersion slope of said optical waveguide fiber is more negative than −4.0 ps/nm²-km over the pre-selected wavelength range.

4. The multiple core optical waveguide fiber of claim 3 wherein the ratio of a total dispersion of said optical waveguide fiber to the total dispersion slope is approximately 50 nm at 1550 nm.

5. The multiple core optical waveguide fiber of claim 3 wherein the total dispersion slope is substantially constant over the pre-selected wavelength range.

6. The multiple core optical waveguide fiber of claim 1 wherein said center region comprises at least four optical waveguide fiber cores arranged as three cores surrounding a centrally positioned core.

7. The multiple core optical waveguide fiber of claim 6 wherein the at least four cores are substantially equal in diameter, the centrally positioned core and the three surrounding cores having an increased relative refractive index percent of a portion of the respective cores.

8. The multiple core optical waveguide fiber of claim 7 further including three structural elements surrounding the centrally positioned core, the three structural elements having a substantially uniform refractive index.

9. The multiple core optical waveguide fiber of claim 8 wherein the three surrounding cores and three structural elements are arranged so that each surrounding core is neighbored by two surrounding structural elements of substantially uniform refractive index.

10. The multiple core optical waveguide fiber of claim 7 wherein the portion of the respective cores having a positive relative refractive index percent includes and is symmetrical about the respective centerlines of the respective cores, the centrally positioned core having a relative refractive index percent of approximately 2.0% and a diameter of approximately 3.0 μm, the three surrounding cores each having a relative refractive index percent of approximately 1.0% and a diameter of approximately 6.4 μm, and the structural elements of substantially uniform refractive index are cores having a relative refractive index percent of approximately 0.7%.

11. The multiple core optical waveguide fiber of claim 10 wherein the at least seven cores each have an outside diameter of approximately 12 μm.

12. The multiple core optical waveguide fiber of claim 8 wherein the portion of the respective cores having a positive relative refractive index percent includes and is symmetrical about the respective centerlines of the respective cores, the centrally positioned core has a portion of relative refractive index percent of approximately 2.0% and a diameter of approximately 3.5 μm, the three surrounding cores having a core portion of positive relative refractive index percent each having a relative refractive index percent of approximately 0.35% and a diameter of approximately 10.9 μm, and the three structural elements having uniform refractive index are spacing elements having a relative refractive index percent of approximately zero.

13. The multiple core optical waveguide fiber of claim 12 wherein each of the at least seven structural elements have an outside diameter of approximately 13 μm.

14. A method of making a multiple core optical waveguide fiber comprising the steps:

a) fabricating a plurality of core or spacing element preforms, said core or spacing element preforms having a refractive index profile, at least two of the core preforms having respective refractive index profiles that are different from each other;
b) bundling the plurality of core or spacing element preforms to form a multiple core preform structure;
c) surrounding the bundled core preforms with a clad layer to form a draw preform; and,
d) drawing the draw preform into a multiple core optical waveguide fiber; wherein,
the multiple core preform structure is configured to provide a multiple core optical waveguide fiber wherein light propagated within the multiple core optical waveguide fiber is coupled between at least two of the cores, said multiple core waveguide fiber having a total dispersion and a total dispersion slope which are negative over a pre-selected wavelength range.

15. The method of claim 14 wherein the step of fabricating includes the step of adding a dopant material to provide an increased relative refractive index percent of a portion at least one of said core preforms.

16. The method of claim 14 wherein the plurality of core or spacing element preforms includes four core preforms and three spacing element preforms of substantially equal outside diameter, the preforms configured to have six preforms abutting a centrally positioned core preform.

* * * * *